(12) United States Patent
Kamamura et al.

(10) Patent No.: US 7,182,676 B2
(45) Date of Patent: Feb. 27, 2007

(54) MACHINING APPARATUS AND MACHINING METHOD OF WORK END FACE, ROLLER AND ROLLER BEARING

(75) Inventors: Yuko Kamamura, Kanagawa (JP); Atsushi Kario, Kanagawa (JP); Shigeo Kudou, Kanagawa (JP); Wataru Watanabe, Kanagawa (JP); Suguru Sakakibara, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/080,560

(22) Filed: Mar. 16, 2005

(65) Prior Publication Data

US 2005/0233683 A1    Oct. 20, 2005

(30) Foreign Application Priority Data

Mar. 16, 2004 (JP) .......................... P.2004-073926
Feb. 15, 2005 (JP) .......................... P.2005-037614

(51) Int. Cl.
*B24B 5/00* (2006.01)

(52) U.S. Cl. .................................................... 451/242

(58) Field of Classification Search ................ 451/332, 451/333, 339, 194, 168, 303, 56, 443, 10, 451/242, 246, 49, 50, 51, 52
See application file for complete search history.

(56) References Cited

U.S. PATENT DOCUMENTS 2,551,568 A * 5/1951 Roshong ..................... 451/397
2,754,635 A     7/1956 Ortegren
3,859,756 A     1/1975 Zerbola
3,889,428 A     6/1975 Steinegger et al.
4,531,327 A *   7/1985 Dzewaltowski et al. .... 451/244
5,609,514 A *   3/1997 Yasunaga et al. ............ 451/65
6,955,583 B2 * 10/2005 Dall'Aglio ..................... 451/5

FOREIGN PATENT DOCUMENTS

| DE | 26 36 689 A1 | 8/1976 |
| JP | 59-34502 A | 2/1984 |
| JP | 2002-86336 A | 3/2002 |
| JP | 2003-21145 A | 1/2003 |
| JP | 3455411 B2 | 7/2003 |
| JP | 08-074858 A | 4/2004 |

OTHER PUBLICATIONS

Johann Modler, "Grinding Technology for Production Precision Automation," Catalogue 1991.

* cited by examiner

*Primary Examiner*—Jacob K. Ackun, Jr.
(74) *Attorney, Agent, or Firm*—Sughrue Mion, PLLC

(57) ABSTRACT

A machining apparatus 10 of an end face of a roller includes a rotatable inner disk 11, a cage 14 having a pocket portion 13 for holding a plurality of rollers 12 at predetermined intervals in a peripheral direction at an outer diameter portion of the inner disk 11 and rotatable independently from the inner disk 11, and a drive belt 15 hung over outer diameter portions of the plurality of rollers 12 held by the inner disk 11 and the cage 14, and by rotating the inner disk 11, the cage 14 and the drive belt 15 in predetermined directions, the roller 12 is revolved while being rotated and the end face of the roller is crowned by an elastic cup grinding wheel 19.

3 Claims, 13 Drawing Sheets

MACHINING APPARATUS AND MACHINING METHOD OF WORK END FACE, ROLLER AND ROLLER BEARING

BACKGROUND OF THE INVENTION

The present invention relates to a machining apparatus and a machining method of machining an end face of a work, a roller provided by the machining method, and a roller bearing having the roller.

An end face of a work of a roller bearing slides on a rib on a side of a track ring and therefore, in order to reduce friction heat generated between the end face of the roller and the rib, as shown by FIG. 13 and FIG. 14, a crowned face 2 is provided between an end face of a roller 1 and an outer diameter face of a roller 1.

As a method of machining such a crowned face 2 at the end face of the roller 1, there is known a method of machining the end face of the roller by an elastic grinding wheel having Young's modulus of 10 MPa through 500 MPa by using a horizontal type double head surface grinder.

According to the method of machining an end face of a roller, the rollers are not machined piece by piece but the rollers can be machined at a high efficiency by continuous machining. Further, the roller can be machined smoothly without producing an edge at a portion of connecting the outer diameter face and a chamfer face 3, a portion of connecting the chamfer face 3 and the crowned face 2, and a portion of connecting the crowned face 2 and a plane portion of the end face of the roller (refer to, for example, Patent Reference 1).

In addition, there is provided a method of machining an face of a roller which allows the machining of an end face of a work while rotating the work and the machining of the end face of the roller at a high efficiency (refer to, for example, Patent References 2 and 3)

[Patent Reference 1]
Unexamined Japanese Patent Application Publication No. 2003-21145

[Patent Reference 2]
DE No. 2636689

[Patent Reference 3]
Japanese Patent No. 3455411

However, although according to Patent Reference 1, mentioned above, a smoothly continuous crowned shape can be continuously machined at the end face of the roller with a high efficiency, there is a drawback that accuracy of roller end face runout with outside surface is poor since rotation (self rotation) of the work is not stabilized.

On the other hand, according to Patent References 2 and 3, mentioned above, accuracy of swinging the end face of the roller can be improved since the end face of a work is machined while rotating the work. However, there is a drawback that shape differences in the end face of rollers after machining will be larger if such differences exist before machining since a machining tool is pressed to the end face of the work at a fixed position.

SUMMARY OF THE INVENTION

The present invention is carried out to eliminate the above-mentioned drawbacks. An object of the present invention is to provide a machining apparatus and a machining method of machining an end face of a work capable of continuously machining a smoothly continuous crowned shape at the end face of a roller with a high efficiency, improving accuracy of roller end face runout with outside surface, and reducing shape differences in an end face of rollers after machining, a roller, and a roller bearing.

The above-mentioned objects of the present invention are achieved the following configuration:
(1) a machining apparatus of an end face of a work characterized in including a spindle for rotating, revolving and support works, a charge and discharge unit for continuously charging the works to and discharging the works from the spindle, an elastic machining tool, and a pressure unit for pressing the machining tool to an end face of the works,
(2) the machining apparatus of an end face of a work described in (1), characterized in including a pressure slide table for placing the machining tool thereon and cable of pressing the machining tool to the end face of the works at a fixed pressure when advancing, and a pressure actuator for driving the pressure slide table,
(3) the machining apparatus of an end face of a work described in (2), characterized in that the pressure actuator is driven hydraulically and a hydraulic circuit thereof includes a speed control section,
(4) the machining apparatus of an end face of a work described in (2) or (3), characterized in including a linear gauge for measuring a position of the pressure slide table when the end face of the work is machined,
(5) the machining apparatus of an end face of a work described in any one of (2) to (4), characterized in including a positioning slide table for slidabily placing the pressure slide table thereon and positioning a fixed side of the pressure slide table in a predetermined position,
(6) the machining apparatus of an end face of a work described in any one of (1) to (5), characterized in that the machining tool is an elastic cup grinding wheel,
(7) the machining apparatus of an end face of a work described in any one of (1) to (5), characterized in that the machining tool is an abrasive belt,
(8) the machining apparatus of an end face of a work described in 6, characterized in including a dressing tool pivotably provided concentric with a work revolution axis of the spindle for dressing the elastic cup grinding wheel,
(9) a machining apparatus of an end face of a work described in any one of (1) to (8), characterized in that the spindle includes a rotatable inner disk, a cage including a pocket portion for holding a plurality of the works at predetermined intervals in a peripheral direction at an outer diameter portion of the inner disk and rotatable independently from the inner disk and a drive belt hung over outer diameter portions of the plurality of the works held by the inner disk and the cage,
(10) a method of machining an end face of the work using the machining apparatus described in any one of (1) to (9), characterized in including machining an end face of the work by pressing an elastic machining tool to the end face of the work at a fixed pressure while rotating, revolving and supporting the work,
(11) a rotating roller characterized in that an end face thereof is machined by using a method of machining an end face of a work described in (10), and
(12) a roller bearing having a plurality of rollers rotatably arranged between a pair of track rings, characterized in that an face end of the rollers is machined by using a method of machining an end face of a work described in (10).

According to the invention, an end face of a work is machined using an elastic machining tool while rotating and revolving the work through a spindle. Therefore, the rotation of the work is kept stable and the accuracy of roller end face runout with outside surface can be improved. Further, the end face of works continuously provided by a charge and discharge unit is machined with an elastic machining tool. Therefore, a smoothly continuous crowned shape can be continuously machined at the end face of the roller with a high efficiency.

In addition, the machining tool is pressed to the end face of the works with a pressure unit at a fixed pressure for machining purposes. Therefore, the end face of works can be machined in a constant machining amounts without being affected by shape differences in the end face of works before machining. Shape differences in the end face of works after machining can also be reduced.

BRIEF DESCRIPTION OF THE DRAWINGS

FIG. 4A is a diagram showing the deformation of the elastic cup grinding wheel and pressure distribution when the elastic cup grinding wheel 19 is pressed to the end face of a work. FIG. 4B is a diagram showing a machining shape of the end face of a work.

FIG. 11A is a plan view. FIG. 11B is a front view. FIG. 11C is a left-side view of FIG. 11B. FIG. 11D is a right-side view of FIG. 11B.

DETAILED DESCRIPTION OF THE PREFERRED EMBODIMENTS

Figure 1:
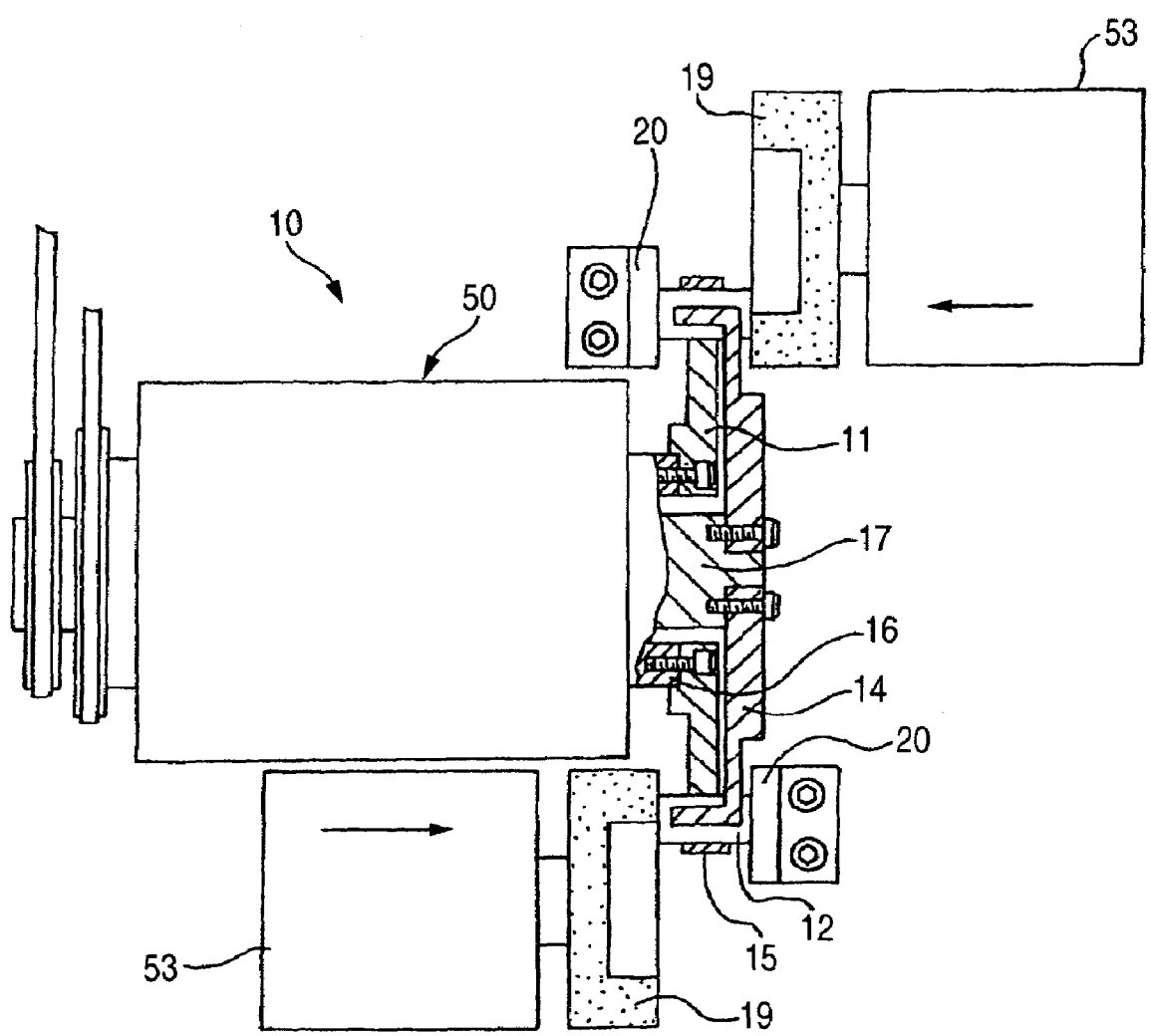
FIG. 1 is a partially broken view showing a machining apparatus of an end face of a work according to a first embodiment of the invention.
Figure 2:
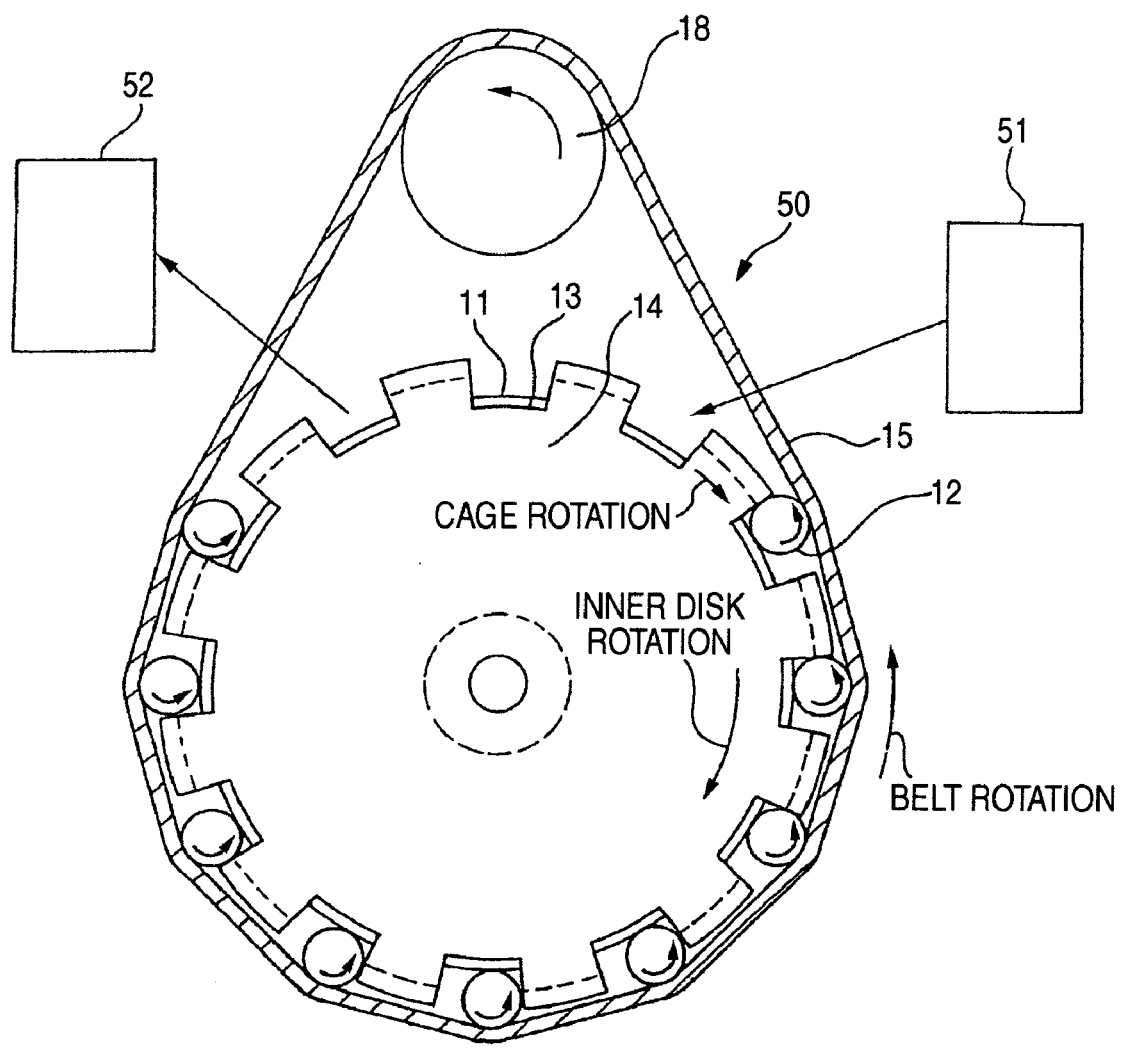
FIG. 2 is a side view of an essential portion viewing from a right side of FIG. 1.
Figure 3:
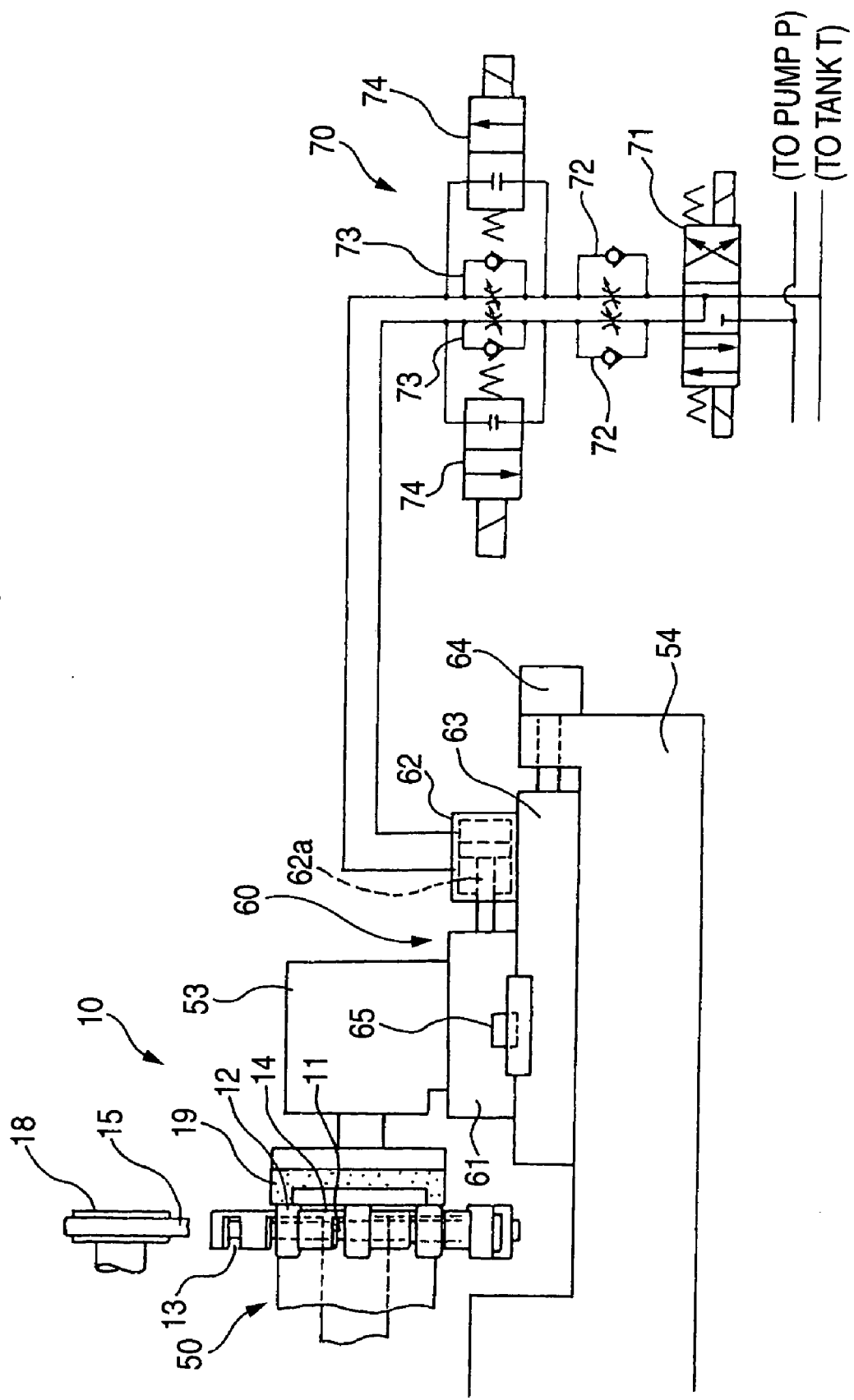
FIG. 3 is a diagram for explaining a pressure unit.

The embodiments according to the invention will be described below in details with reference to the drawings. FIG. 1 is a partially broken plan view showing a machining apparatus of an end face of a work according to a first embodiment of the invention. FIG. 2 is a side view of an essential portion viewed from a right side of FIG. 1. FIG. 3 is an explanatory diagram for describing a pressure unit. FIG. 4 is a diagram for describing the machining of an end face of a work using an elastic cup grinding wheel. FIG. 5 is an explanatory diagram for describing a relationship among peripheral speeds of an inner disk, a cage and a drive belt for stably rotating a roller in a cage pocket. FIGS. 6 to 12 show a diagram for describing a machining apparatus of an end face of a work according to other embodiments of the present invention. Note that in this embodiment, a work for a cylindrical roller as a work is taken as an example.

As shown in FIGS. 1 to 3, a machining apparatus 10 of an end face of a work according to a first embodiment of the present invention includes a spindle 50 for rotating, revolving and supporting works 12, a charge unit 51 and a discharge unit 52 for continuously charging the works 12 to and discharging the works 12 from the spindle 50, a spindle grinding wheel unit 53 including an elastic cup grinding wheel 19 as an elastic machining tool, and a pressure unit 60 for pressing the elastic cup grinding wheel 19 to an end face of the works 12 at a fixed pressure.

As shown in FIGS. 1 and 2, the spindle 50 spindle includes a rotatable inner disk 11, a cage 14 including pocket portions 13 for holding the plurality of works 12 substantially at equal intervals in a peripheral direction at an outer diameter portion of the inner disk 11 and rotatable independently from the inner disk 11, and the drive belt 15 hung over the outer diameter portions of the plurality of works 12 held by the inner disk 31 and the cage 14. The inner disk 11 and the cage 14 are disposed to be within an axial direction length of the work 12 to prevent the inner disk 11 and the cage 14 from interfere with the elastic cup grinding wheel 19.

Further, by driving to rotate the inner disk 11 and the drive belt 15 in directions inverse to each other, a rotational movement is provided to the work 12 and by rotating the cage 14, a revolutional movement is provided to the work 12.

As shown in FIG. 1, mounted on the inner disk support hollow shaft 16 as an inner disk driving shaft so that the inner disk 11 and the cage 14 can be rotated concentric independently of each other. The cage 14 is mounted on a cage support shaft 17 as a cage driving shaft. In addition, the driving belt 15 is driven by a drive motor not shown through a pulley 18.

As shown in FIG. 2, the charge unit 51 is configured to automatically supply works 12 continuously to a charge position of the spindle 50 and the discharge unit 52 to automatically discharge works continuously from the discharge position of the spindle 50. By rotating the inner disk 11, the cage 14 and the drive belt 15 at predetermined rotational speeds, the end face of the work can be machined while rotating and revolving the work 12 continuously.

As shown in FIG. 1, two spindle grinding wheel units 53 are arranged. Cup grinding wheels 19 for machining the end face of the work 12 are pressed to the end faces of the works 12 from directions inverse to each other at two locations, and by arranging stoppers 20 at end faces of the works 12 on sides opposed to the pressing faces, the two end faces of the work 12 are made to be able to be machined. In this case, by adjusting an angle of the cup grinding wheel 19 relative to the end face of the work 12, an angle of crowning (refer to FIG. 14) can be adjusted.

Works 12 continuously supplied from the charge unit 51 are rotated and revolved via the spindle 50 and machined with the elastic cup grinding wheel 19 pressed to the end face of the works at a fixed pressure by means of the pressure unit 60. In this way, the end face can smoothly be machined without producing the edge at the portion of connecting the chamfer face 3 and the crowned face 2 and the portion of connecting the crowned face 2 and the plane portion of the end face of the work (refer to FIGS. 13 and 14).

Figure 4A:
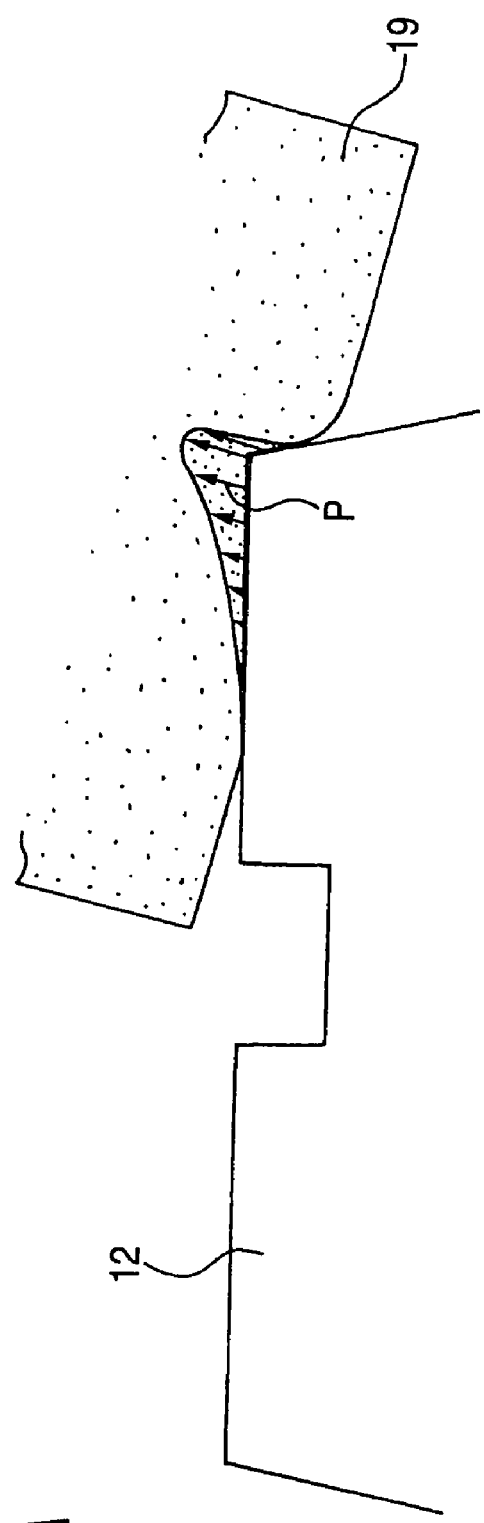
FIGS. 4A and 4B are diagrams for explaining the machining of an end face of a work with an elastic cup grinding wheel.
Figure 4B:
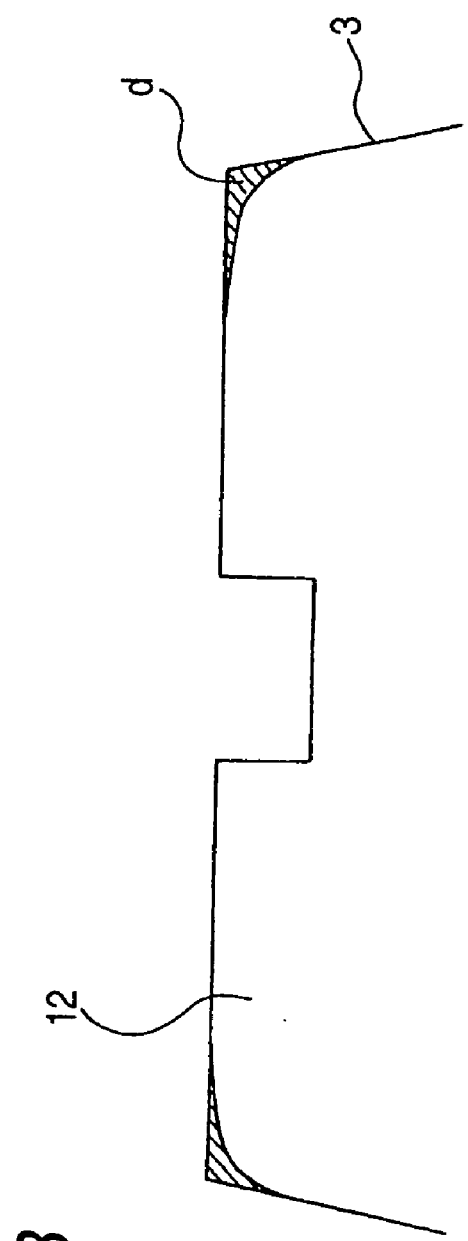

The elastic deformation of the elastic cup grinding wheel 19 where the elastic cup grinding wheel 19 is in contact with the end face of the work 12 results in machining according to pressure distribution P shown in FIG. 4A. When the elastic cup grinding wheel 19 is therefore pressed to the end face of the work 12, the highest pressure is obtained at a portion of connecting the plane portion of the end face of the work and the chamfer face 3 and the portion is machine more, thus making it possible to obtain a smoothly continuous crowned shape (refer to FIG. 4B). When, on the other hand, the end face of the work is machined with a hardly elastic tool, the portion where the machining tool interferes with the work 12 is removed. This causes an edge between the worked portion and the non-worked portion, thus making it impossible to obtain a smoothly continuous crowned shape.

In addition, the longer it is used for machining, the more worn the elastic cup grinding wheel 19 will be. The elastic cup grinding wheel 19 is pressed to the end face of the work 12. Even when worn, the elastic cup grinding wheel 19 can therefore machines the end face of the work 12 always at a constant machining force with stable machining amount and with little shape difference.

As shown in FIG. 3, the pressure unit 60 is disposed on the spindle 50 and the common bed 54 and includes a pressure slide table 61 for placing a spindle grinding wheel unit 53 thereon and cable of pressing an elastic cup grinding wheel 19 to an end face of a work 12 at a fixed pressure when advancing, a pressure actuator 62 for hydraulically driving the pressure slide table 61 through a hydraulic circuit 70, a positioning slide table 63 for slidably placing thereon and positioning the pressure slide table 61 in a predetermined position, a positioning actuator 64 for driving the positioning slide table 63, and a linear gauge 65 provided between the pressure slide table 61 and the positioning slide table 63 for measuring the position of the pressure slide table 61 when the end face of the work 12 is machined.

The pressure slide table 61 is guided by a linear guide, an air slide, and the like and the slide resistance for the guide is set to a sufficiently small value respective to the elastic cup grinding wheel 19's force for machining the end face of a work and pressurizing force. The pressure actuator 62 supplies oil to or discharges oil from the right- or left-side oil chamber of a piston 62a through the hydraulic circuit 70 to drive the piston 62a and advance and retreat the pressure slide table 61.

The positioning slide table 63 is preferably used when increasing the service thickness of the elastic cup grinding wheel 19 via the small-stroke pressure slide table 61 or when accommodating a change in position where the work 12 is set on the spindle 50. If, for example, the elastic cup grinding wheel 19 becomes worn, the position of the operating pressure slide table 61 is kept fixed by controlling the positioning actuator 64 and adjusting the position of the positioning slide table 63, based on linear gauge 65 measurements.

The linear gauge 65 is used to measure the position of the pressure slide table 61 when machining the end face of the work and monitor the worn state of the elastic cup grinding wheel 19. Concretely, the worn state of the elastic cup grinding wheel 19 can be detected by calculating the difference between the measurements and reference values (for example, measurements for the pressure slide table 61 with a new elastic cup grinding wheel 19 pressed to the end face of a work 12) and the position of the positioning slide table 63. The time to replace the elastic cup grinding wheel 19 can also be determined from measurement taken by the linear gauge 65.

In addition, the elastic cup grinding wheel 19 requires grinding wheel grinding that involves natural blade appearance so as to maintain good machining bite thereof and continue correct machining. Unstable contact of the spindle grinding wheel unit 53 with a work 12 would cause uneven working surface and therefore irregularities in the working surface of the elastic cup grinding wheel 19, thus preventing the elastic cup grinding wheel 19 from machining the end face of the work with a correct accuracy. In this embodiment, a damping action is given to the pressure actuator 62 for driving the pressure slide table 61 to prevent the spindle grinding wheel unit 53 from contacting the work 12 in an unstable manner so that the spindle grinding wheel unit 53 cannot move rapidly.

As shown in FIG. 3, a hydraulic circuit 70 for the hydraulically operating pressure actuator 62 therefore has two types of circuits, that is, a circuit with a narrow throttle and a circuit with a wide throttle. A switch over is made to the circuit with the wide throttle to transfer the pressure slide table 61 promptly when the elastic cup grinding wheel 19 is pressed to the end face of a work 12 at the start of pressurization and when the elastic cup grinding wheel 19 is retreated from the end face of the work 12 after machining is over. During the continued machining of the end face of the work 12 by the elastic cup grinding wheel 19, a switch over is made to the circuit with the narrow throttle to give a damping action to the movement of the pressure slide table 61.

Concretely, the hydraulic circuit 70 is configured to provide oil from the pump P to the left-or right-side oil chamber of the pressure actuator 62 piston 62a through the operation of a main selector valve 71. The circuit 70 is also configured to discharge the oil from the right- or left-side oil chamber of the piston 62a to advance or retreat the pressure slide table 61. Between the main selector valve 71 and the pressure actuator 62, there are arranged in series two throttle valves (flow control valves with a check valve) with a wide throttle and two throttle valves with a narrow throttle (flow control valves with a check valve, a speed control section). Selector vales 74 are arranged in parallel for two throttle valves 73 with a narrow throttle.

When the elastic cup grinding wheel 19 is pressed to the end face of the work 12 at the start of machining and when the elastic cup grinding wheel 19 is retreated from the end face of the work 12 after the end of machining, each selector valve 74 is opened and switched to a circuit with a wide throttle, thereby moving the pressure slide table 61 and/or the spindle grinding wheel unit 53 quickly. During the continued machining of the end face of a work by the elastic cup grinding wheel 19, each selector valve 74 is closed and switched to a circuit with a narrow throttle, thereby providing a damping action to the movement of the pressure slide table 61.

Further, although in the case of a double head plane grinder, Young's modulus of the elastic grinding wheel is proper to be 10 MPa through 1000 MPa, different from a double head plane grinder in which a grinding wheel and a roller is in parallel with each other, when an angle is provided between the cup grinding wheel 19 and the roller 12 constituting the roller as described above, Young's ratio of the elastic grinding wheel is proper to be 50 Mpa through 1000 Mps which is slightly harder.

Here, in order to stably rotate the work 12 at inside of the pocket portion 13 of the cage 14, it is necessary to pertinently select peripheral speeds of the inner disk 11, the cage 14 and the drive belt 15. FIG. 5 illustrates a relationship among speeds of the work 12, the inner disk 11, the cage 14, and the drive belt 15.

Figure 5A:
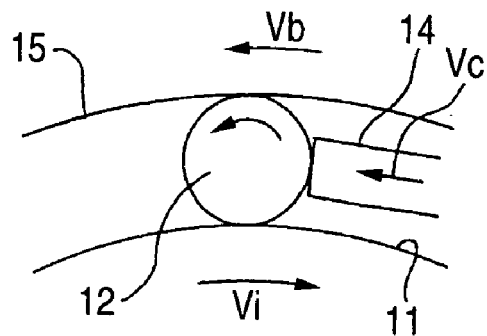
FIGS. 5A to 5D are explanatory diagrams for a relationship among peripheral speeds of an inner disk, a cage and a drive belt for stably rotating a roller in a cage pocket.

FIG. 5A shows a state in which the cage 14 exerts a drive force of revolution, the inner disk 11 rotates in a direction reverse to that of the cage 14, and the work 12 is pressed to the cage 14. In this case, in order to stably rotate the work 12 at inside of the pocket portion 13 of the cage 14, when a rotational speed of the cage 14 is designated by rotation Vc, a rotational speed of the inner disk 11 is designated by notation Vi, and a speed of the drive belt 15 is designated by notation Vb, it is necessary to establish a relationship among the speeds such that $Vb=(Vi+2 \times Vc) \times \alpha$ and $\alpha$ (ratio of roller peripheral speed to drive belt peripheral speed) <1.

When $\alpha=1$, the work 12 is not brought into close contact with the cage 14. By selecting $\alpha$ to be smaller than 1, the work 12 is pressed to the cage 14 by rotating the inner disk 11, by rotating the drive belt 15 slightly slower than the work 12 driven by the cage 14 and the inner disk 11, brake is applied and an attitude of the work 12 is stabilized.

Figure 5B:
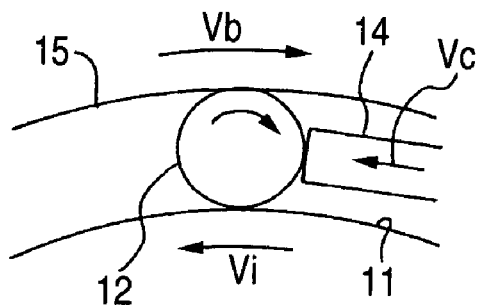

FIG. 5B shows a state in which the cage 14 exerts the drive force of revolution, the drive belt 15 is rotated in a direction reverse to that of the cage 14, and the work 12 is pressed to the cage 14. In this case, in order to stably rotate the work 12 at inside of the pocket portion 13 of the cage 14, when the rotational speed of the cage 14 is designated by notation Vc, the rotation of the inner disk 11 is designated by notation Vi and the speed of the drive belt 15 is designated by notation Vb, it is necessary to establish a relationship among the speeds such that $Vb=(Vi-2 \times Vc) \times \alpha$ and $\alpha>1$.

When $\alpha=1$, the work 12 is not brought into close contact with the cage 14. By selecting a to be slightly larger than 1, the work 12 is pressed to the cage 14 by rotating the drive belt 15, by rotating the inner disk 11 slightly slower than the work 12 driven by the cage 14 and the drive belt 15, brake is applied and the attitude of the work 12 is stabilized.

Further, here, $\alpha$ is preferably about 1.01 through 1.10.

Figure 5C:
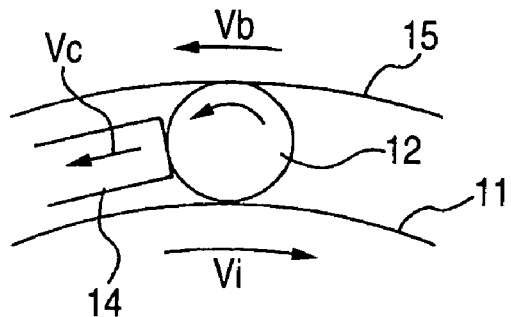

FIG. 5C shows a case of constituting a state in which the cage 14 brakes revolution of the roller 12.

In this case, there may be established a relationship in which $Vb=(Vi+2 \times Vc) \times \alpha$ and $\alpha>1$.

Figure 5D:
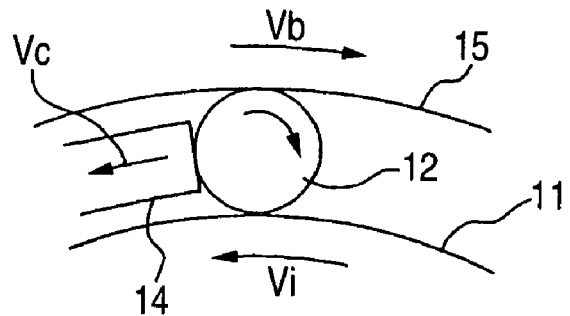

FIG. 5D shows a case constituting a state in which the cage 14 brakes revolution of the roller 12 and in which the roller 12 is rotated in a reverse direction.

In this case, there may be established a relationship in which $Vb=(Vi-2 \times Vc) \times \alpha$ and $\alpha<1$.

In this way, according to the embodiment, an end face of a work 12 is machined using an elastic machining tool 19 while rotating and revolving the work 12 through a spindle. Therefore, the rotation of the work 12 is kept stable and the accuracy of roller end face runout with outside surface can be improved. Further, the end face of works 12 continuously provided by a charge unit 51 is machined with an elastic machining tool 19. Therefore, a smoothly continuous crowned shape can be continuously machined at the end face of the roller with a high efficiency.

In addition, the elastic cup grinding wheel 19 is pressed to the end face of the works 12 with a pressure unit 60 at a fixed pressure for machining purposes. Therefore, the end face of works 12 can be machined in a constant machining amounts without being affected by shape differences in the end face of works 12 before machining. Shape differences in the end face of works 12 after machining can also be reduced.

Further, although according to a double head plane grinder of the background art, since rotation of the work 12 is not stabilized, a random machining mark remains at the end face of the roller after machining, according to the embodiment, since rotation of the roller 12 is stabilized, a machining mark in a spiral shape aligned in rotating direction is produced at the end face of the roller after machining.

Next, a machining apparatus of an end face of a work according to a second embodiment of the invention will be explained with reference to FIGS. 6 through 8. Further, portions duplicated with those of the above-described first embodiment will be given the same notations in the respective drawings and not be explained.

Figure 6:
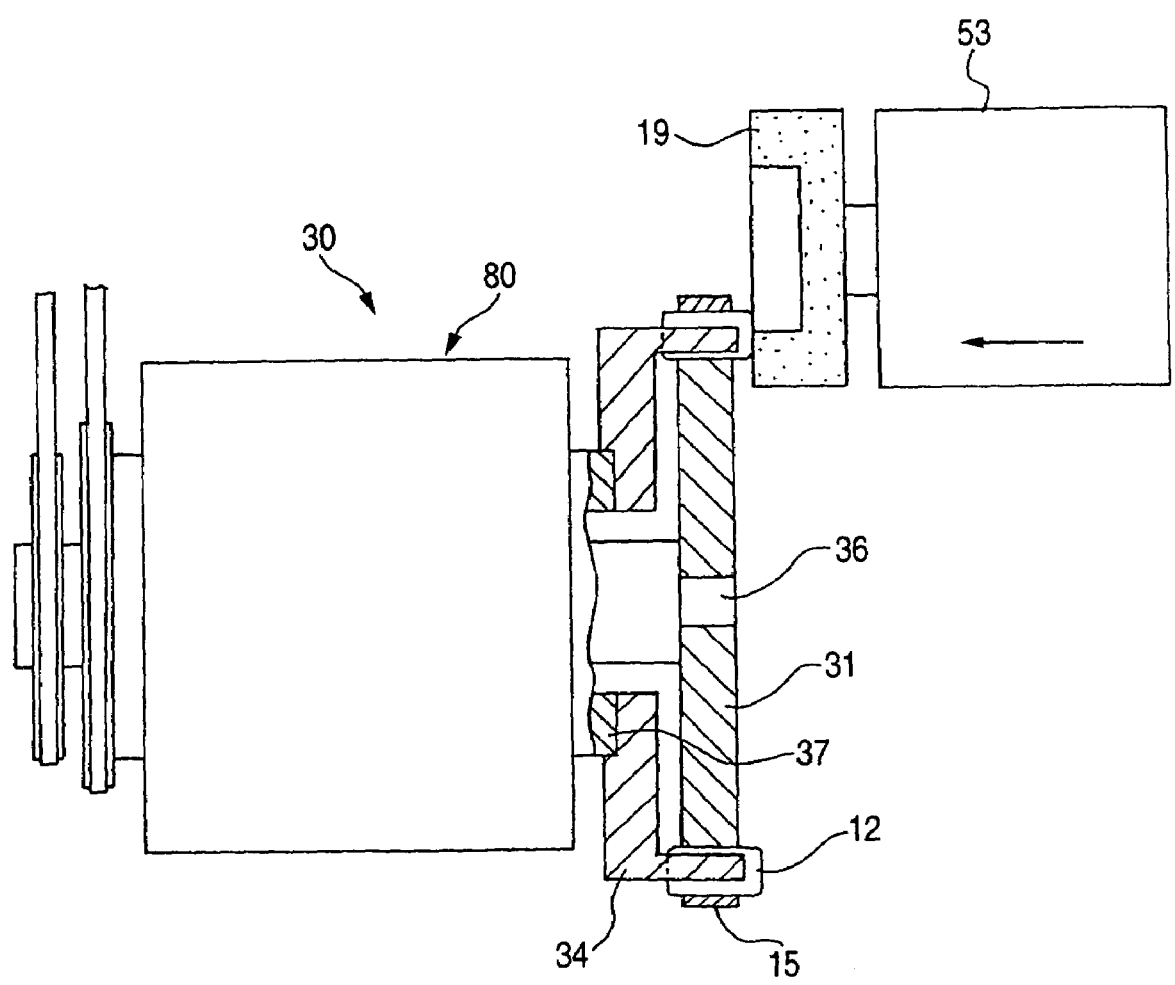
FIG. 6 is a partially broken view showing a machining apparatus of an end face of a work according to a second embodiment of the invention.
Figure 7:
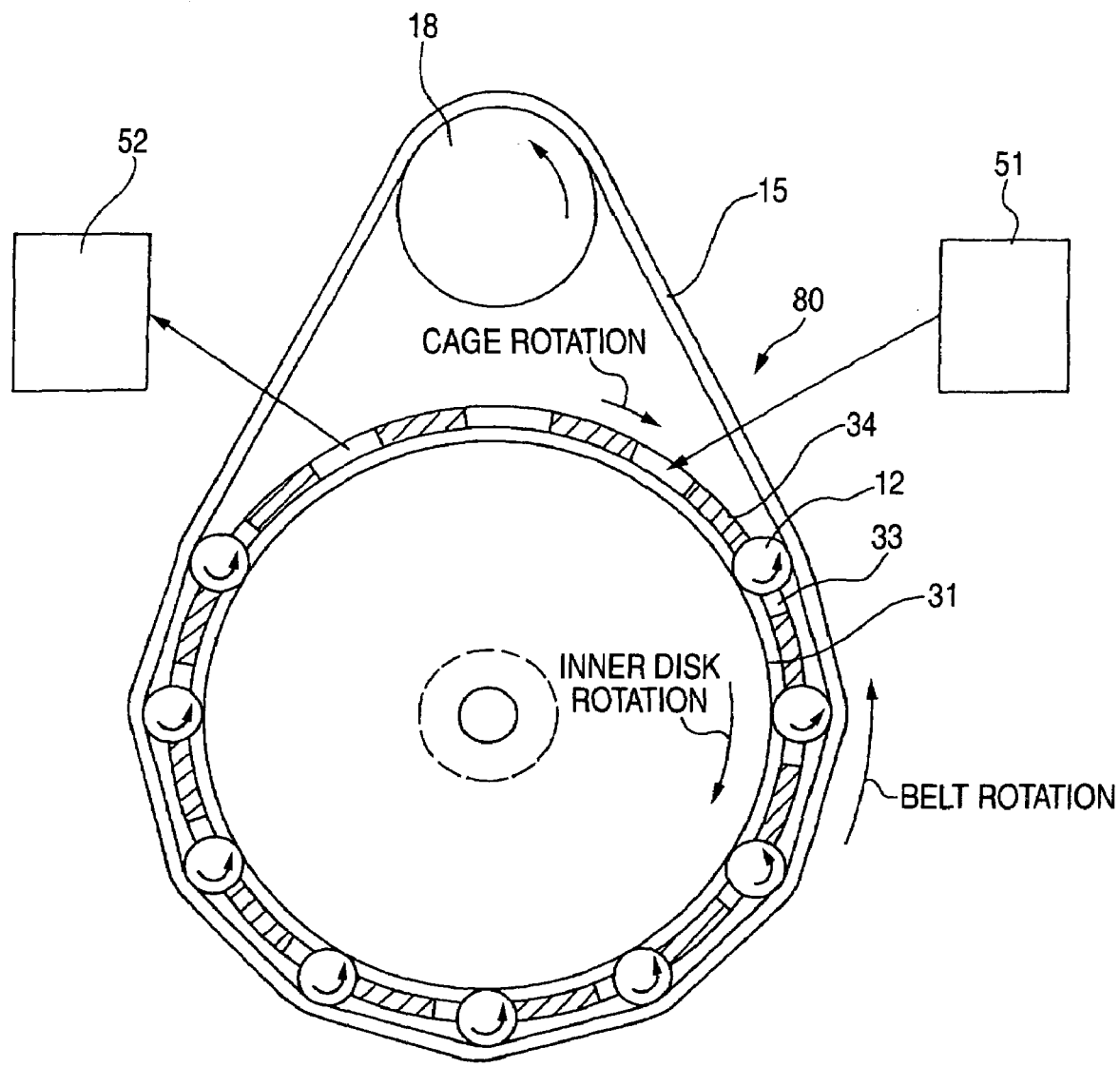
FIG. 7 is a side view of an essential portion viewing from a right side of FIG. 6.
Figure 8:
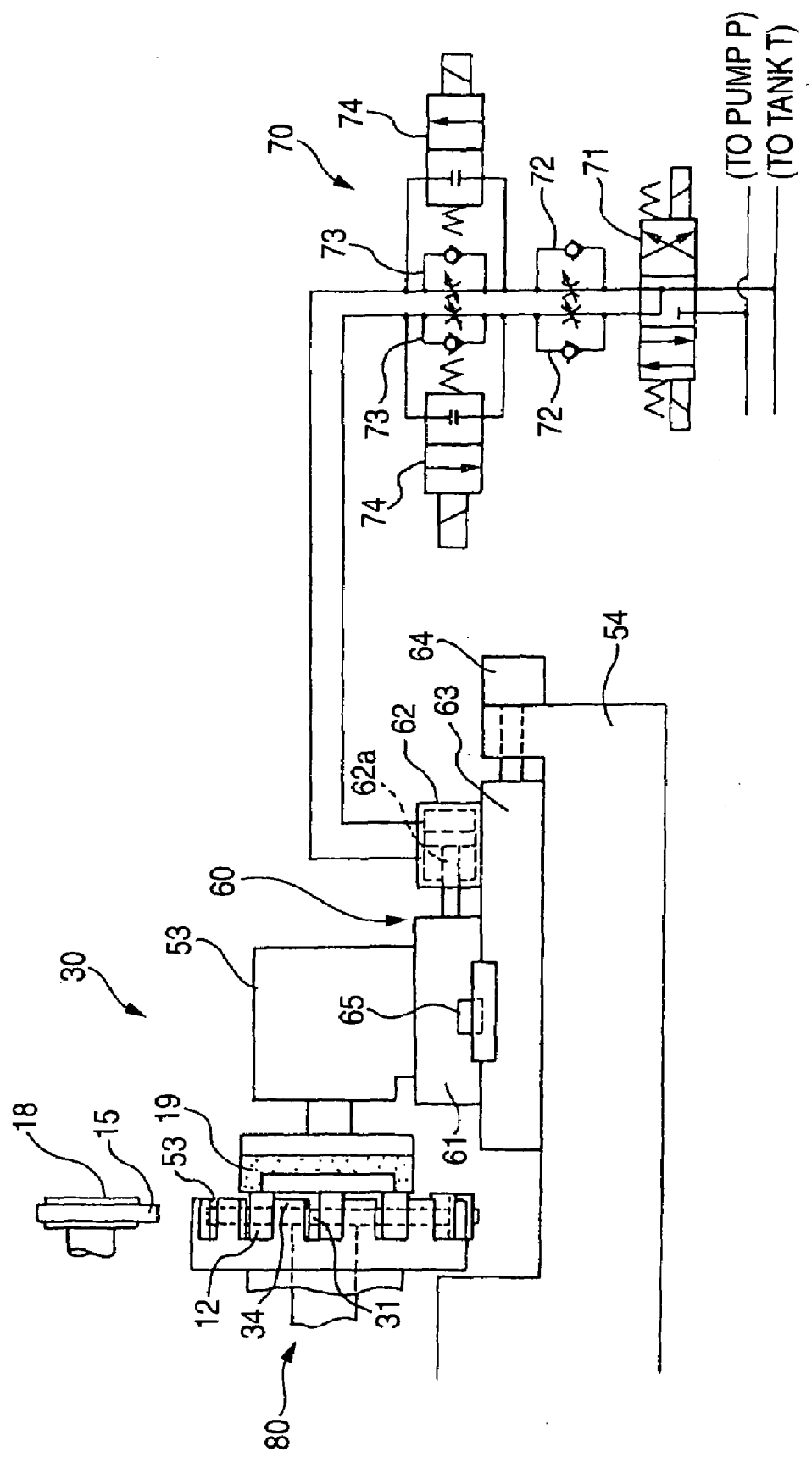
FIG. 8 is an explanatory diagram for explaining a pressure unit.

As shown in FIGS. 6 to 8, a machining apparatus 10 of an end face of a roller according to a second embodiment of the present invention includes a spindle 80 for rotating, revolving and supporting works 12, a charge unit 51 and a discharge unit 52 for continuously charging the works 12 to and discharging the works 12 from the spindle 80, a spindle grinding wheel unit 53 including an elastic cup grinding wheel 19 as an elastic machining tool, and a pressure unit 60 for pressing the elastic cup grinding wheel 19 to an end face of the works 12 at a fixed pressure.

As shown in FIGS. 6 and 8, the spindle 80 spindle includes a rotatable inner disk 31, a cage 34 including pocket portions 33 for holding the plurality of rollers 12 substantially at equal intervals in a peripheral direction at an outer diameter portion of the inner disk 31 and rotatable independently from the inner disk 31, and the drive belt 15 hung over the outer diameter portions of the plurality of works 12 held by the inner disk 31 and the cage 34 and the pocket portions 33 of the cage 34 are constituted by a comb-like shape each for supporting the outer diameter face and one end face of the roller 12.

Further, by driving to rotate the inner disk 31 and the drive belt 15 in directions reverse to each other, the work 12 is provided with a rotational movement and by rotating the cage 34, the work 12 is provided with a revolutional movement.

As shown by FIG. 6, the inner disk 31 is attached to an inner disk support shaft 36 constituting an inner disk drive shaft and the cage 34 is attached to a cage supporting hollow shaft 37 constituting a cage drive shaft such that the inner disk 31 and the cage 34 can be driven coaxially with each other and independently from each other. Further, the drive belt 15 is driven by a drive motor not shown via the pulley 18.

As shown by FIG. 6, the elastic cup grinding wheel 19 for machining the end face of the work 12 is pressed to the end face of the work 12 at one location and the end face of the work 12 can be machined under the state. In this case, by adjusting an angle of the elastic cup grinding wheel 19 to the end face of the work 12, the angle of crowning (refer to FIG. 14) can be adjusted.

Further, according to the embodiment, the end face of the work 12 on one side is supported by the cage 34 and therefore, only the end face on one side of the work 12 can be machined. Although in order to machine the both end faces of the work 12, it is necessary to machine one sides thereof by using two sets of the kind of the apparatus, even when a length of the work 12 in the axial direction is short and the inner disk and the cage cannot be arranged as in the above-described first embodiment, no problem is posed according to the embodiment.

Figure 13:
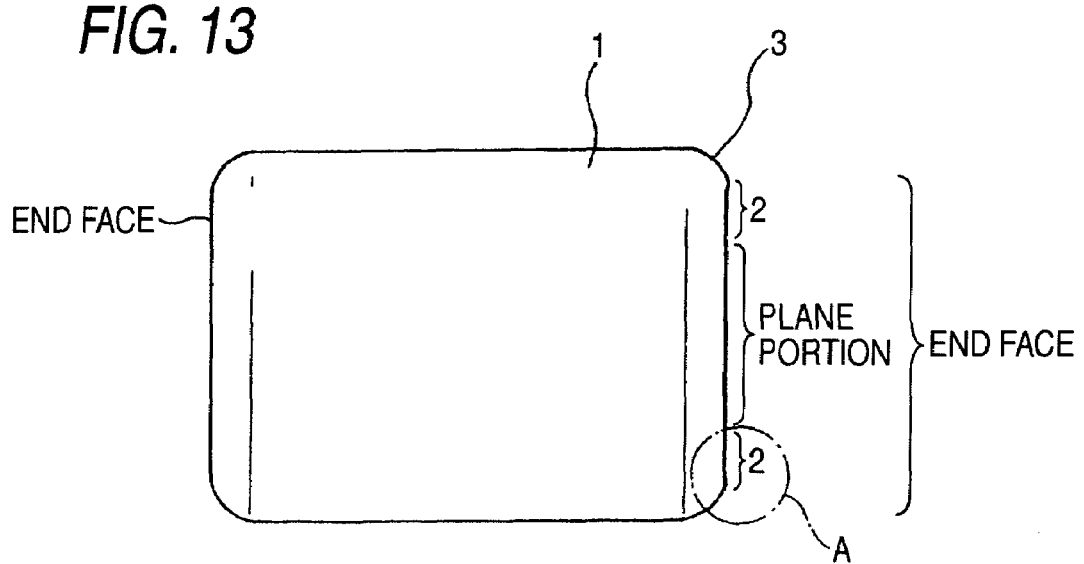
FIG. 13 is a view for explaining a crowned face and a chamfer face of an end face of a work (roller).
Figure 14:
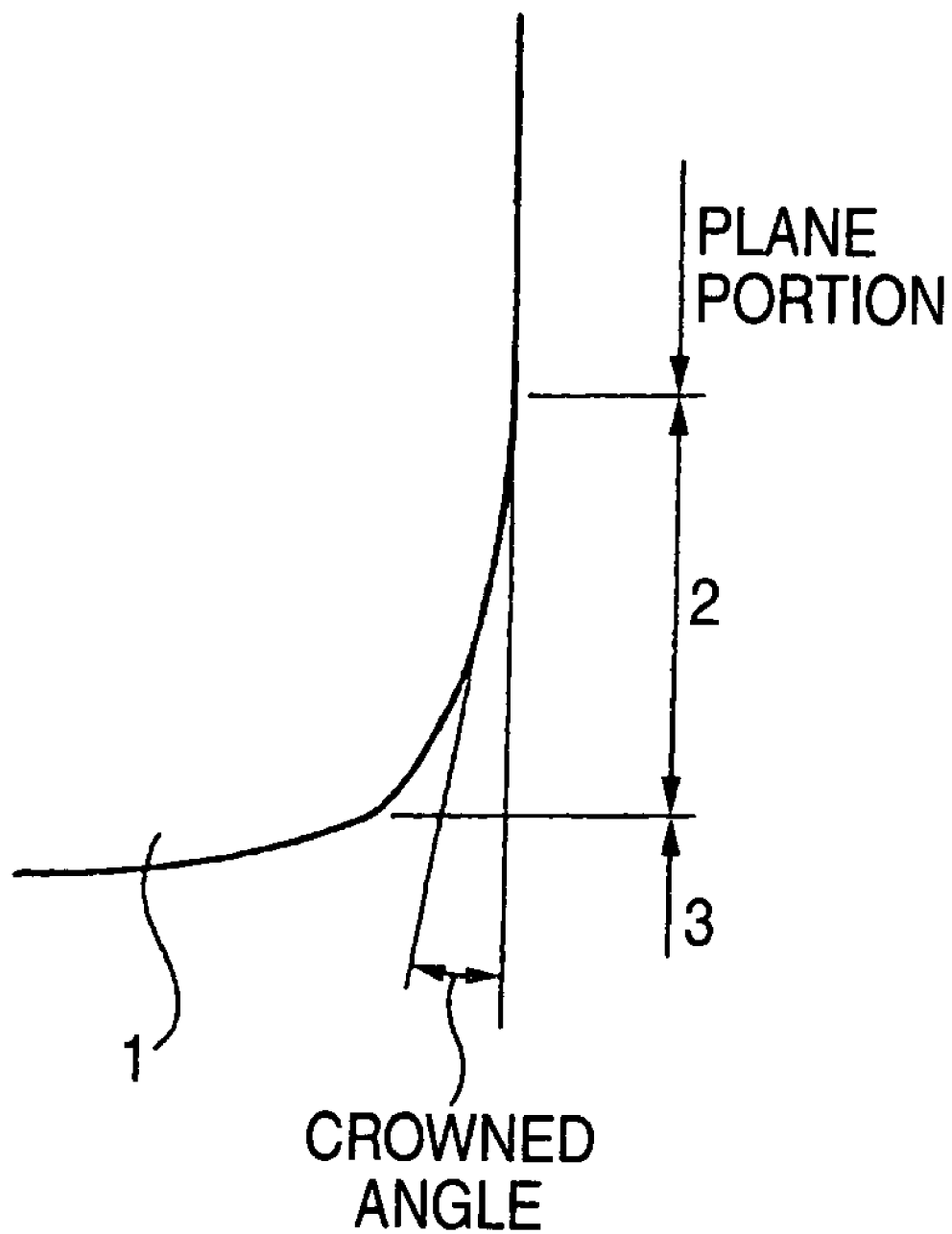
FIG. 14 is an enlarged view of portion A of FIG. 13.

Works 12 continuously supplied from the charge unit 51 are rotated and revolved via the spindle 80 and machined with the elastic cup grinding wheel 19 pressed to the end face of the works at a fixed pressure by means of the pressure unit 60 shown in FIG. 8, as in the first embodiment described above. In this way, the end face can smoothly be machined without producing the edge at the portion of connecting the chamfer face 3 and the crowned face 2 and the portion of connecting the crowned face 2 and the plane portion of the end face of the roller, as shown in FIGS. 13 and 14.

Figure 9:
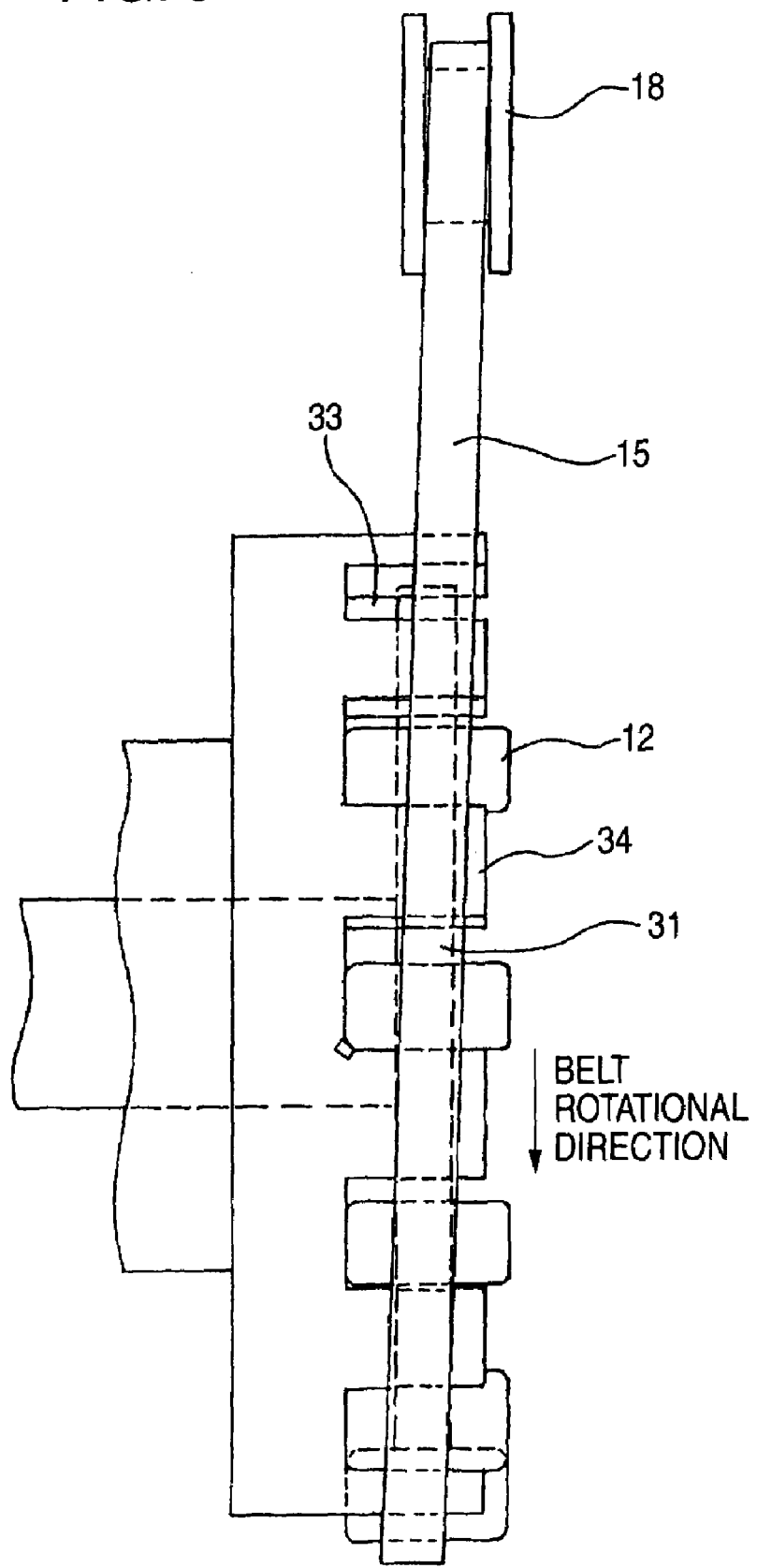
FIG. 9 is a view showing a state of skewing a drive belt to an axial direction.

Further, when the work 12 is rotated without machining the work 12 before starting to machine or after finishing to machine the end face of the work 12, there is a possibility that the work 12 comes out from the pocket portion 33, in order to press the work 12 stably to the bottom portion of the pocket portion 33 by preventing the work 12 from coming out from the pocket portion 33, as shown by FIG. 9, the drive belt 15 may be skewed in the axial direction. The other constitution and the operation and the effect are similar to those of the above-described first embodiment.

Figure 10:
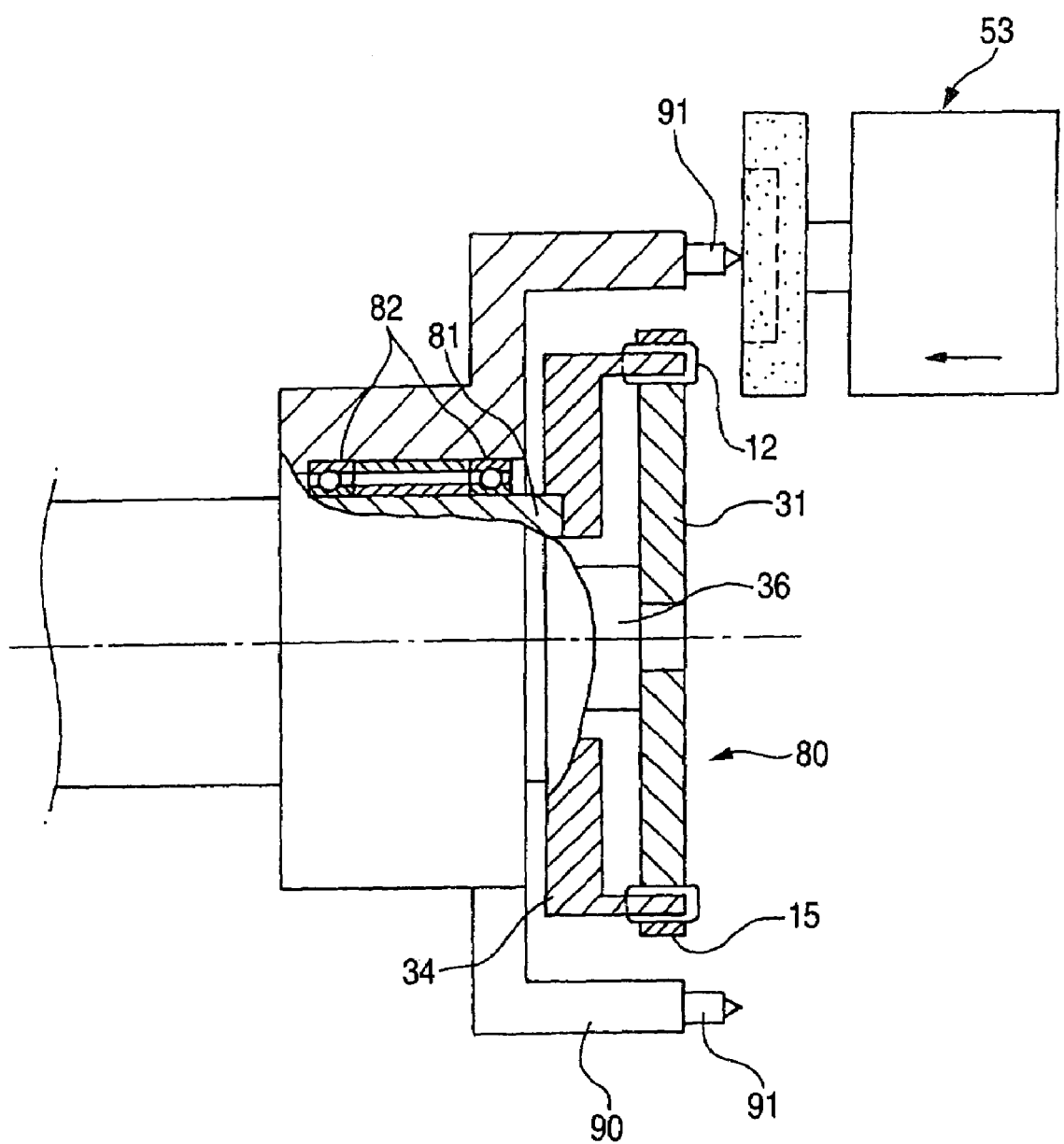
FIG. 10 is partially broken view showing an essential portion of a machining apparatus of an end face of a work according to a third embodiment of the invention.

A machining apparatus of an end face of a work according to a third embodiment of the present invention will be explained below with reference to FIG. 10. In this embodiment, a dressing tool is added to the spindle 80 according to the second embodiment. Therefore, portions duplicated with those of the above-described first embodiment will be given the same notations in the respective drawings and not be explained.

In the machining apparatus according to the third embodiment, machining cannot be impossible with a proper accuracy in some cases if there is a large fluctuation in the working face of the grinding wheel of an elastic cup grinding wheel 19 immediately after grinding wheel replacement, for example. When there is a large fluctuation in the working face of the grinding wheel immediately after grinding wheel replacement, for example, the grinding wheel therefore requires dressing. As shown in FIG. 10, in this embodiment, a dressing tool having a dresser diamond 91 is pivotably attached to the spindle housing 80 of the spindle 80 via a plurality of roller bearings 82. The dressing tool has a dresser diamond 91 that slews around a shaft concentric with the revolving shaft of a work 12 on a spindle 80. The dressing tool 90 is turned by means of a drive unit not shown and the elastic cup grinding wheel 19 is dressed with the dresser diamond 91 so that the end face of a work 12 can be machined with a proper accuracy.

As shown in FIG. 8 for the second embodiment, the elastic cup grinding wheel 19 is driven together with a spindle grinding wheel unit 53 by means of the pressure unit 60. When the elastic cup grinding wheel 19 is dressed, the pressure slide table 61 is therefore pressed to the advance or retreat end thereof and fixed. The positioning slide table 63 is positioned in a suitable position based on a dressing cut amount determined by the thickness of the elastic cup grinding wheel 19 and the position of the dresser diamond 91. The elastic cup grinding wheel 19 is dressed by turning the dresser diamond 91 under the above condition. When a new elastic cup grinding wheel 19 is dressed, the position of the positioning slide table 63 can be pre-determined based on the thickness of the elastic cup grinding wheel 19 and the setting position and mechanical configuration dimensions of the dresser diamond 91.

When the elastic cup grinding wheel 19 worn during machining is dressed, the position of the positioning slide table 63 can be pre-determined based on the position of the pressure slide table 61 measured with a linear gauge 65 at the machining of the end face of the work 12, the positioning position and mechanical configuration dimensions of the positioning slide table 63, and the setting position of the preset dresser diamond 91. The other constitution and the operation and the effect are similar to those of the above-described second embodiment.

A machining apparatus of an end face of a work according to a fourth embodiment of the present invention will be explained below with reference to FIG. 11. Further, portions duplicated with those of the above-described first and second embodiments will be given the same notations in the respective drawings and not be explained.

Figure 11A:
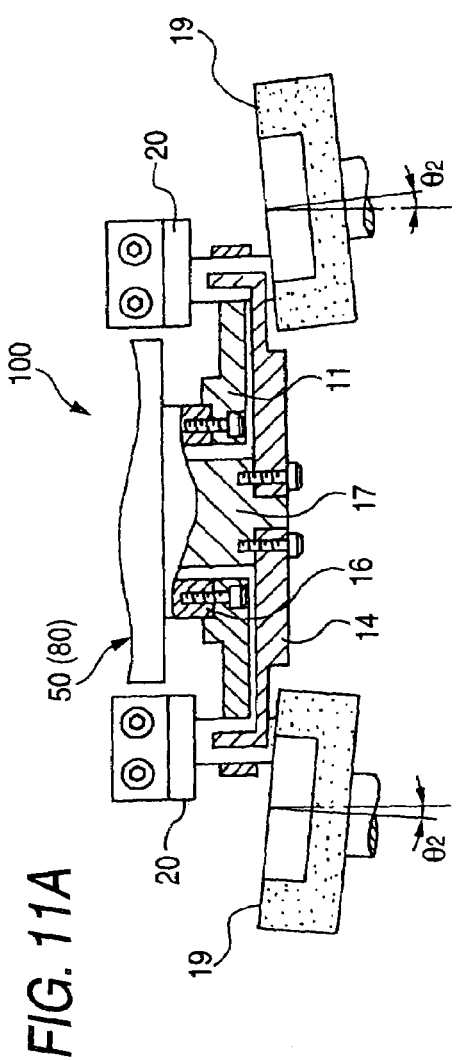
FIGS. 11A to 11D are diagrams showing an essential portion of a machining apparatus of an end face of a work according to a fourth embodiment of the invention.
Figure 11D:
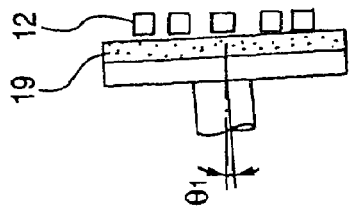
Figure 11B:
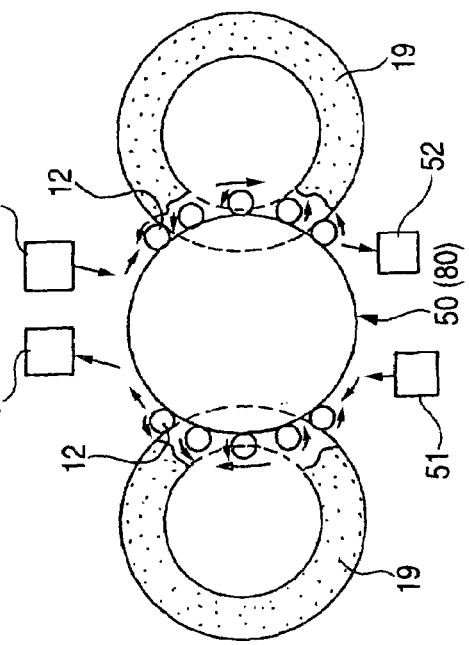

As shown in FIGS. 11A and 11B, a machining apparatus 100 of an end face of a work according to a fourth embodiment includes a spindle 59 (or spindle 80) for rotating, revolving and supporting works 12 and two charge units 51 and two discharge units 52 for continuously charging the works 12 to and discharging the works 12 from the spindle 50 (80). The machining apparatus 100 includes two elastic cup grinding wheels 19 spaced apart opposite side from each other and a pressure unit 60 for pressing the elastic cup grinding wheel 19 to an end face of the works 12 at a fixed pressure. Each elastic cup grinding wheel 19 is driven by the pressure unit 60 together with the spindle grinding wheel unit 53. Further, the configuration of the spindle grinding wheel unit 53 and pressure unit 60 for driving the elastic cup grinding wheel 19 is the same as in the first embodiment and not illustrated.

In the machining apparatus 100 according to the fourth embodiment, works 12 continuously supplied from one charge unit 51 (the right-side unit shown in FIG. 11B) are rotated and revolved via the spindle 50 (80) and machined with one elastic cup grinding wheel 19 (the left-side grinding wheel shown in FIG. 11B) pressed to the end face of the works 12 at a fixed pressure by means of the pressure unit 60. The works 12 is then discharged once from one discharge unit 52. Then, the works 12 are inverted in the axial direction thereof before continuously re-supplied to the other charge unit 51 (the left-side unit in FIG. 11B). Further, the works 12 continuously supplied are rotated and revolved via the spindle 50 (80) and machined with the elastic cup grinding wheel 19 pressed to the end face of the works 12 at a fixed pressure by means of the pressure unit 60 to machine. The works are then discharge from the other discharge unit 52. In this way, both end faces of the works 12 are machined.

The two elastic cup grinding wheels 19 are aligned for adjustments so that they are slighted tilted with respect to the end face of the works rotated and revolved via the spindle 50 (80).

Figure 11C:
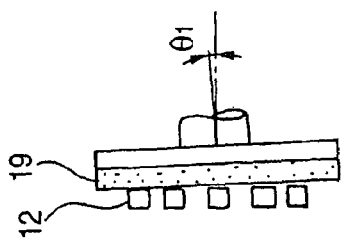

The rotation axis of the elastic cup grinding wheel 19 is first tilted by a predetermined angle $\theta1$ with respect to the revolution axis of the work 12 (refer to FIGS. 11C and 11D). It is desirable to widen the entrance-side (supply-side) intervals and narrow the exit-side (discharge-side) intervals when the work 12 enter the machining portion of the elastic cup grinding wheel 19 by means of revolutional movement. The tilting angle $\theta1$ of the elastic cup grinding wheel 19 is set to prevent the excessive and rapid machining of the work 12 at the entrance side and so that a sufficiently long area can be obtained.

As shown in FIG. 11A, the rotation axis of the elastic cup grinding wheel 19 is tilted by a predetermined angle $\theta2$ with respect to the revolution axis of the work 12 to adjust the contact of the elastic cup grinding wheel 19 with the end face of the work 12. In this way, the crowned shape of the work 12 can be adjusted in case of machining flat the entire end face of the work 12 and in case of machining only the periphery of the portion of connecting the outer diameter face and the chamfer face of the work 12.

In addition, the work 12 is, by the revolutional movement thereof, brought into contact with the entire working face of the elastic cup grinding wheel 19. This provides the wear of the entire working face of the grinding wheel, thus resulting in no remaining local unworn portion thereof. The other constitution and the operation and the effect are similar to those of the above-described first or second embodiment.

Further, the aligning adjustment according to the present invention is also applicable in the machining apparatus according to the above-mentioned embodiments.

Further, the machine apparatus of the end face of the work according to the invention is not limited to those of the above-described respective embodiments but can pertinently be modified or improved.

Figure 12:
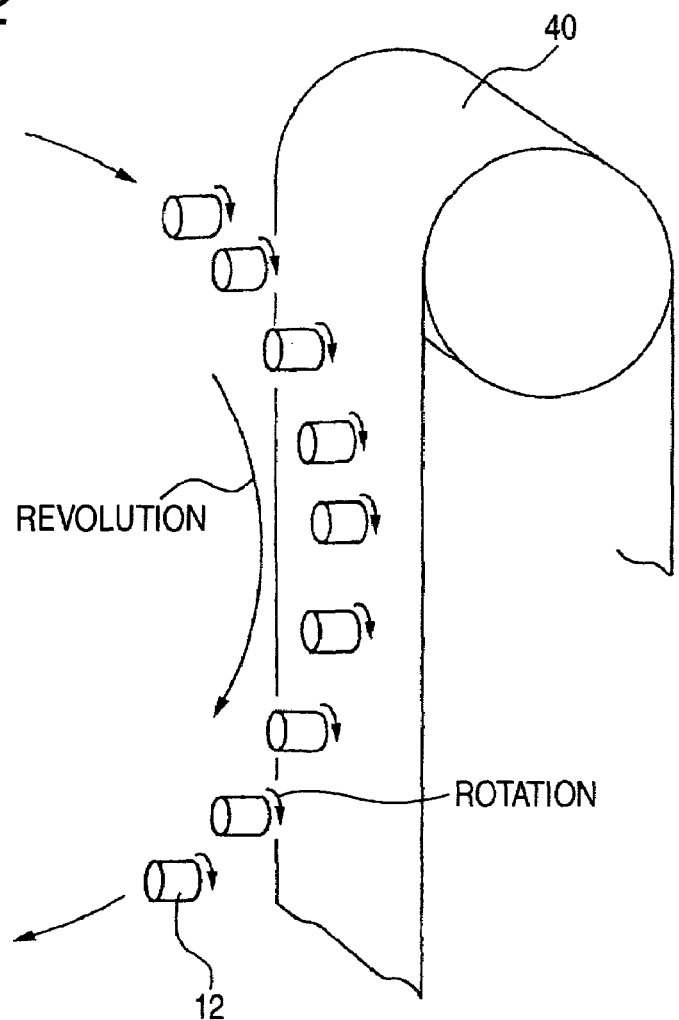
FIG. 12 is a perspective view showing a machining apparatus of an end face of a work according to a fifth embodiment of the present invention.

For example, although according to the above-described respective embodiments, there is shown an example of the case of using the elastic cup grinding wheel as an elastic tool, in place thereof, as shown by FIG. 12, the end face of the work 12 can be machined by a smoothly continuous crowned shape with excellent swinging accuracy by an abrasive belt 40 having a pertinent tension.

In this case, as in the individual embodiments described above, works 12 continuously supplied from a charge unit 51 are rotated and revolved via the spindle 50 (80) and machined with the abrasive belt 40 pressed to the end face of the works 12 at a fixed pressure by means of the pressure unit 60. In this way, machining can be performed in the same way as with the elastic cup grinding wheel 19. The operation and the effect similar to those of the above-described first embodiment can be obtained. The abrasive belt 40 can adjust a machining force (normal line grinding resistance) by pertinently adjusting the tension, and can machine to follow the roller and therefore, machining can be carried by a crowned shape smoothly connected to the plane portion and the chamfer face of the end face.

Further, although according to the above-described respective embodiments, the cylindrical roller is exemplified as the roller to be machined, the invention is applicable also to a spherical roller.

Further, in the fourth embodiment, the pressure slide table can be used with the position side table to advance the machining tool. The pressure slide table may be used alone.

In addition thereto, materials, shapes, dimensions, modes, numbers, arranging locations and the like of the works, spindle, charge and discharge units, machining tools, pressure units, pressure slide tables, pressure actuators, speed control section, linear gauges, positioning slide tables, elastic cup grinding wheels, abrasive belts, dressing tools, inner disks, cages, drive belts exemplified in the above-described respective embodiments are arbitrary and not limited.

What is claimed is:

1. A machining apparatus of an end face of a work comprising:
    a spindle for rotating, revolving and supporting works,
    a charge and discharge unit for continuously charging the works to and discharging the works from the spindle,
    an elastic machining tool,
    a pressure unit for pressing, at a fixed pressure, the machining tool to an end face of the works,
    a pressure slide table for placing the machining tool thereon and capable of pressing the machining tool to the end face of the works at the fixed pressure when advancing,
    a pressure actuator for driving the pressure slide table, and
        a linear gauge for measuring a position of the pressure slide table when the end face of the work is machined.

2. A machining apparatus of an end face of a work comprising:
    a spindle for rotating, revolving and supporting works,
    a charge and discharge unit for continuously charging the works to and discharging the works from the spindle,
    an elastic machining tool, wherein the machining tool is an elastic cup grinding wheel, a pressure unit for pressing, at a fixed pressure, the machining tool to an end face of the works, and
    a dressing tool pivotably provided concentric with a work revolution axis of the spindle for dressing the elastic cup grinding wheel.

3. A machining apparatus of an end face of a work comprising:
    a spindle for rotating, revolving and supporting works,
    a charge and discharge unit for continuously charging the works to and discharging the works from the spindle,
    an elastic machining tool, and
    a pressure unit for pressing, at a fixed pressure, the machining tool to an end face of the works,
    wherein the spindle includes:
        a rotatable inner disk,
        a cage including a pocket portion for holding a plurality of the works at predetermined intervals in a peripheral direction at an outer diameter portion of the inner disk and rotatable independently from the inner disk, and
        a drive belt hung over outer diameter portions of the plurality of the works held by the inner disk and the cage.

* * * * *